United States Patent [19]

Schaffer

[11] Patent Number: 4,958,913
[45] Date of Patent: Sep. 25, 1990

[54] MAGNIFIER LENS ASSEMBLY

[75] Inventor: Irving Schaffer, Fairfield, Conn.

[73] Assignee: Luxo Lamp Corporation, Port Chester, N.Y.

[21] Appl. No.: 265,042

[22] Filed: Oct. 31, 1988

[51] Int. Cl.⁵ .............................. G02B 7/02; F23Q 3/00
[52] U.S. Cl. ..................................... 350/252; 362/253; D16/135; D26/51
[58] Field of Search ............... 350/252, 235, 257, 474, 350/478, 245, 243, 244; 362/253, 234, 138, 455; D16/135; D26/51

[56] References Cited

U.S. PATENT DOCUMENTS

| | | | |
|---|---|---|---|
| D. 295,287 | 4/1988 | Krogsrud et al. | D16/135 |
| 1,932,817 | 10/1933 | Gehrke | 350/252 |
| 2,289,272 | 7/1942 | Kibbe | 350/235 |
| 2,377,056 | 5/1945 | Tontrup | 350/235 |
| 4,796,162 | 1/1989 | Krogsrud | 362/253 |

FOREIGN PATENT DOCUMENTS 548427  8/1923  France .................. 350/474

Primary Examiner—Bruce Y. Arnold
Assistant Examiner—Ronald M. Kachmarik
Attorney, Agent, or Firm—Pasquale A. Razzano

[57] ABSTRACT

A magnifier lens assembly mounted within a lamp head including a barrel housing and a first, second and third lens, each of the lenses having a convex surface, an opposing substantially planar surface and a center axis of symmetry of the convex surface; the first, second and third lenses being mounted successively and coaxially within the barrel housing with the convex surface of the first lens facing the convex surface of the second lens, and the substantially planar surface of the second lens facing the convex surface of the third lens wherein the barrel housing includes means for securing the lenses in relatively fixed relation to each other and means for securing said magnifier lens assembly within said lamp head.

12 Claims, 2 Drawing Sheets

MAGNIFIER LENS ASSEMBLY

BACKGROUND OF THE INVENTION

1. Field of The Invention

This invention relates to a magnifier lens assembly and more particularly, to a magnifier lens assembly mounted within a lamp head.

2. Description of the Prior Art

Lamp head assemblies utilizing a magnifier lens mounted therein to permit inspection of detailed work pieces under the lamp light have been previously proposed in a variety of forms. Such lamps, however, typically have used a single lens which may not have sufficient magnification or may have excessive distortion.

Although it is known, as disclosed in U.S. Pat. No. 1,932,817 to provide a composite or combination lenses in many different forms for producing high magnification and limited distortion, such composite lens systems have not been used in combination with simple lamp heads.

OBJECTS OF THE INVENTION

It is an object of this invention to provide an improved magnifier lens assembly for a lamp head which provides improved magnification and reduced distortion.

Another object of this invention is to provide a lens assembly for a lamp head that minimizes aberrations and, for the largest field of view, yields the least distortion.

Yet another object of this invention is to provide a magnifier lens assembly that is adapted to be conveniently and economically manufactured and mounted within a magnifier lamp head.

SUMMARY OF THE INVENTION

In accordance with an aspect of this invention, a magnifier lens assembly for a lamp head is provided which comprises a barrel housing, first, second, and third lenses, each having a convex surface, an opposing substantially planar surface and a center axis of symmetry of the convex surface. The first, second and third lenses are mounted successively and coaxially within the barrel housing with the convex surface of the first lens facing the convex surface of the second lens, and the substantially planar surface of the second lens facing the convex surface of the third lens. The barrel assembly is structured to secure the lenses in relatively fixed relation to each other while, at the same time, clamping the assembly to a portion of the lamp head.

The above, and other objects, features and advantages of this invention, will be apparent in the following detailed description of an illustrative embodiment thereof which is to be read in connection with the accompanying drawings wherein:

DESCRIPTION OF A PREFERRED EMBODIMENT

Figure 1:
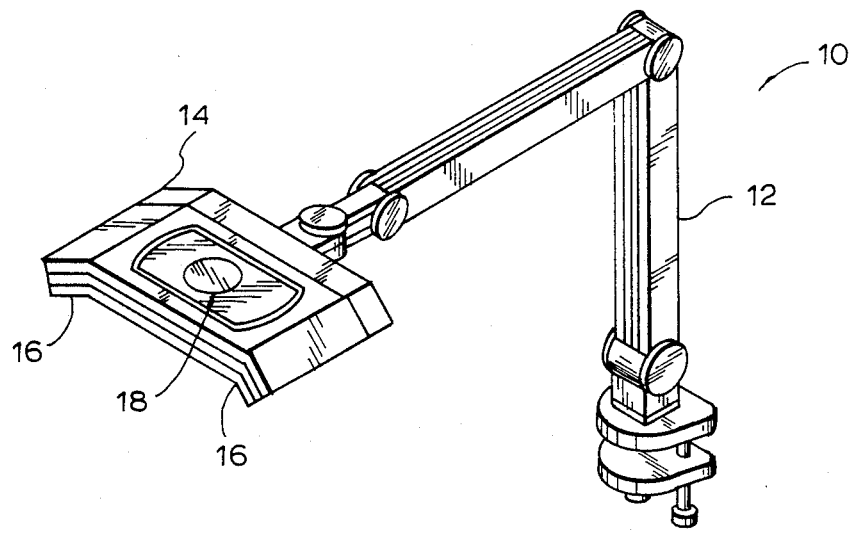
FIG. 1 is a schematic perspective view of a lamp head constructed in accordance with the present invention.

Referring now to the drawings and initially to FIG. 1, a magnifier lamp head is illustrated which is generally constructed as disclosed in U.S. Pat. No. Des. 295,287. The lamp includes a support arm 12 for a lamp head 14. The lamp head includes light bulbs 16 on its lower side for illuminating a work surface. These bulbs are located on opposite sides of a central aperture 15. Heretofore, as disclosed in U.S. Pat. No. Des. 295,287 a single, one piece magnifier lens was mounted in the central aperture 15.

In accordance with the present invention, in lieu of a single magnifier lens, a clear plastic or glass sheet 17 is mounted in central aperture 15 and supports a magnifier lens assembly 18 constructed in accordance with the present invention.

Figure 2:
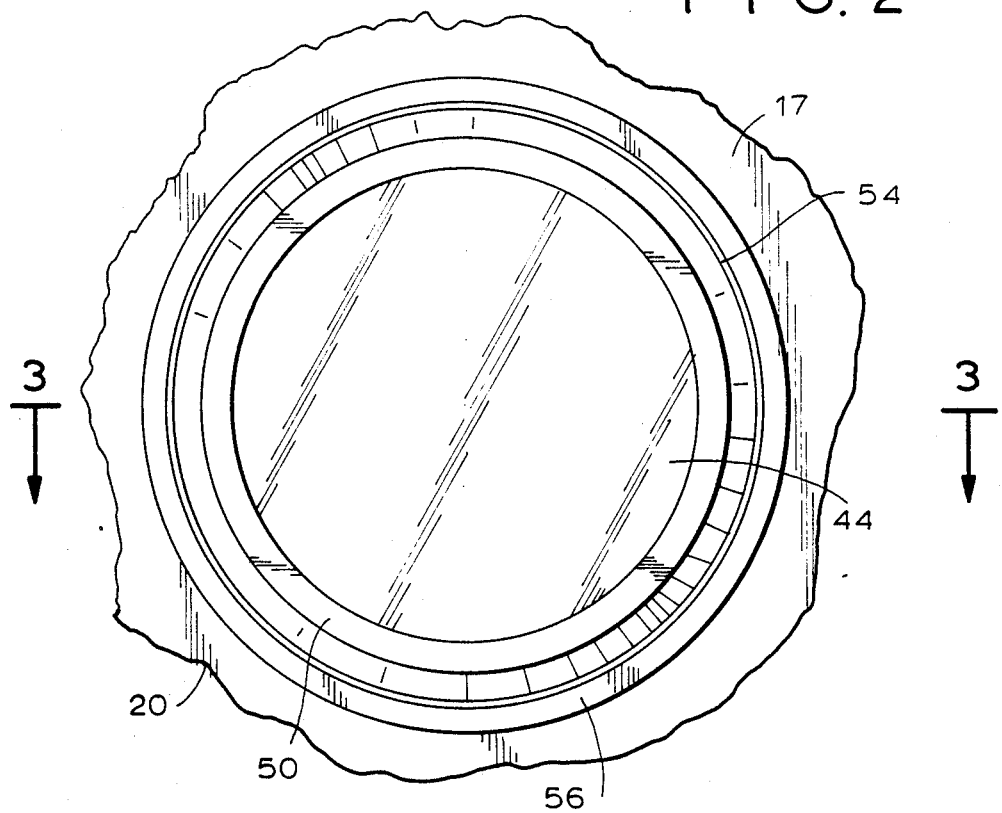
FIG. 2 is a partial top view of the lamp head shown in FIG. 1 illustrating the magnifier lens assembly.
Figure 3:
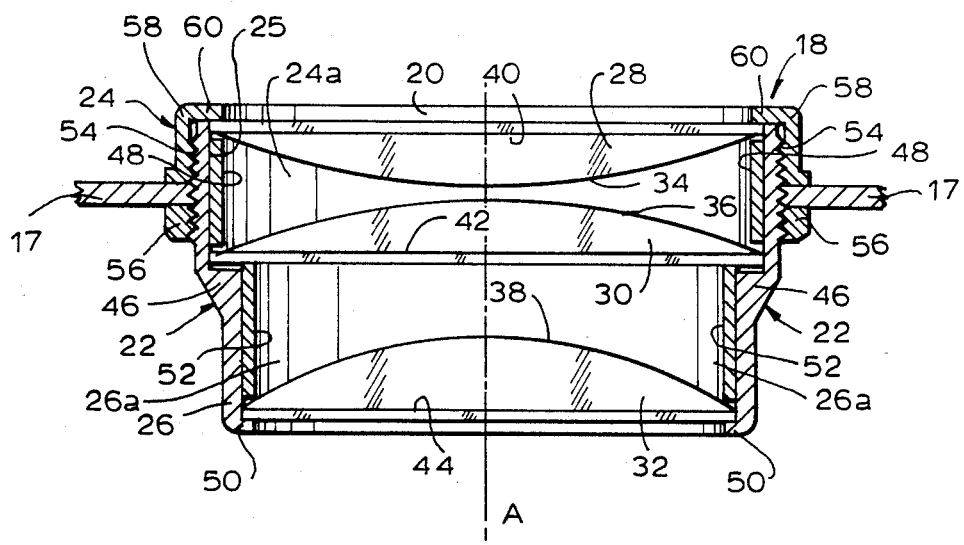
FIG. 3 is a cross sectional view taken along line III—III of FIG. 2.

As seen in FIGS. 2 and 3, magnifier lens assembly 18 is supported in an opening 20 formed in sheet 17. The magnifier lens assembly includes a barrel housing 22 having a top end 24 and a bottom end 26. Barrel housing 22 contains a composite plano-convex lens assembly which includes first lens 28, second lens 30 and third lens 32. Lenses 28 and 30 are of the same diameter and located in the upper barrel portion 24a while lens 32 has a smaller diameter and is located in the lower barrel portion 26a. Each of the lenses has a convex surface, 34, 36 and 38, respectively and an opposing substantially planar surface 40, 42 and 44, respectively. Each lens also has a center axis of symmetry A of the convex surface 34, 36 and 38.

The lenses 28, 30, and 32 are mounted successively and coaxially within barrel housing 22 with the convex surface 34 of the first lens 28 facing the convex surface 36 of second lens 30, and the substantially planar surface 42 of the second lens 30 facing the convex surface 38 of the third lens 32. The second lens 30 is supported in barrel 22 on an internal annular shoulder 46.

The lenses 28 and 30 are maintained in a relatively fixed, almost touching position, as shown in FIG. 2 by a cylindrical spacer 48 located along the inner surface 25 of the upper barrel portion 24a.

The lens 32, located in the lower barrel portion 26a, rests on an inwardly extending annular lip 50 thereof. It is held in a fixed position in the barrel relative to lens 30 by a second cylindrical spacer 52 positioned between lens 30 and lens 32.

Barrel housing 22 has a threaded outer surface 54 which is used to clamp the barrel within the clear plastic sheet 17 and to hold the lenses in assembled relation. To accomplish this, a first internally threaded collar or unit 56 is threaded on surface 54 below sheet 17. A second internally threaded collar or unit 58 is also threaded on barrel 22, but on the opposite or upper side of clear sheet 17. Collar 58 has an inner annular flange 60 which overlies the planar surface of lens 28. By this arrangement, when collars 56 and 58 are tightened towards each other on barrel 22 they will clamp the edges of the opening 20 in sheet 17, therebetween. Additionally, the collar 56 will cooperate with the lip 50 at the bottom end 26 of barrel 22 to clamp the lenses in the barrel between lips 50 and 62 and against spacers 48 and 52 to fix the lenses in the barrel and relative to each other.

Figure 4:
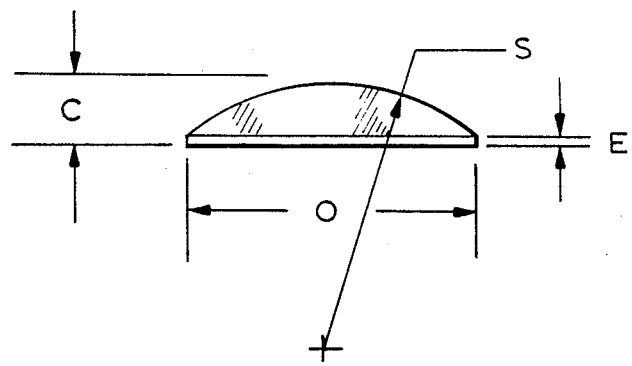
FIG. 4 is a cross sectional view of one of the lenses.

Referring to FIG. 4, each lens has a spherical radius S, and outer diameter O, a nominal center thickness C and an edge thickness E.

The first lens 28 has a convex surface of 4.03±−0.5% diopters, a spherical radius of approximately 130 millimeters and an outer diameter of approximately 90 millimeters. This defines a nominal center thickness of approximately 10.04 millimeters and an edge thickness of approximately 2 millimeters.

The second lens 30 has a convex surface of 5.03±−0.5% diopters, a spherical radius of approximately 104 millimeters and an outer diameter of approximately 90 millimeters. This defines a nominal center thickness of 12.24 millimeters and an edge thickness of approximately 2 millimeters.

The third lens 32 has a convex surface of 8.05±−0.5% diopters, a spherical radius of approximately 65 millimeters and an outer diameter of approximately 80 millimeters. This defines a nominal center thickness of 15.77 millimeters and an edge thickness of approximately 2 millimeters. Each lens 6, 7 and 8 respectively is ground glass where N=1.523 at approximately 587 nm.

The distance D1 between the first lens 28 and the second lens 30 measured along the center axis of symmetry A is approximately 0.5 millimeters and the distance D2 measured between the second lens 30 and the third lens 32, measured along the center axis of symmetry A, is approximately 10 millimeters.

The combination of all these desirable features in a magnifier lens assembly, as disclosed, provides a lens configuration that minimizes aberrations and, for the largest field of view, yields the least distortion. The assembly provides a simple and convenient way of mounting a high powered composite lens in a lamp head assembly.

Although an illustrative embodiment of the invention has been described in detail herein, it is to be understood that the invention is not limited to the foregoing and that various modifications and changes may be effected therein by one skilled in the art without departing from the scope or spirit of the invention as defined in the appended claims.

What is claimed is:

1. A magnifier lens assembly mounted within a lamp head comprising:
   a barrel housing; and
   first, second and third lenses, each of said lenses having a convex surface, an opposing substantially planar surface and a center axis of symmetry of said convex surface;
   said first, second and third lenses being mounted successively and coaxially within said barrel housing with the convex surface of said first lens facing the convex surface of said second lens, and the substantially planar surface of said second lens facing the convex surface of said third lens, and
   means cooperating with said housing for securing the lenses in relatively fixed relation to each other and for securing said magnifier lens assembly within said lamp head; each of said first, second and third lenses being a circular planoconvex lens; said lamp head including a relatively flat mounting surface therein cooperating with said securing means for securing said assembly to the lamp head; said mounting surface having an opening formed therein; and said mounting surface being a sheet of transparent material.

2. A magnifier lens assembly mounted within a lamp head as defined in claim 1, wherein said barrel housing has a threaded outer surface and said securing measure comprises a pair of threaded clamp elements threadedly engaged with said barrel on opposite sides of said sheet and clamping said sheet therebetween.

3. A magnifier lens assembly mounted within a lamp head as defined in claim 2, including spacer means in said barrel housing between said first and second lenses and between said second and third lenses for maintaining said lenses in fixed predetermined positions with each other.

4. A magnifier lens assembly mounted within a lamp head as defined in claim 3, wherein said barrel housing has a lens support surface formed therein for engaging one of said first and third lenses and one of said clamp elements is located to engage the other of said first and third lenses thereby to clamp said lenses together against said spacers to form a unitary fixed assembly mounted in the lamp head.

5. A magnifier lens assembly mounted within a lamp head as in claim 1, wherein the convex surface of said first lens is 4.03±0−0.5% diopters, has a spherical radius of approximately 130 millimeters and an outer diameter of approximately 90 millimeters, and defines a nominal center thickness of approximately 10.04 millimeters and an edge thickness of approximately 2 millimeters.

6. A magnifier lens assembly mounted within a lamp head as in claim 1, wherein the convex surface of said second lens is 5.03±0−0.5% diopters, has a spherical radius of approximately 104.0 millimeters and an outer diameter of approximately 90 millimeters, and defines a nominal center thickness of 12.24 millimeters and an edge thickness of approximately 2 millimeters.

7. A magnifier lens assembly mounted within a lamp head as in claim 1, wherein the convex surface of said third lens is 8.05±0−0.5% diopters, has a spherical radius of approximately 65 millimeters and an outer diameter of approximately 80 millimeters, and defines a nominal center thickness of 15.77 millimeters and an edge thickness of approximately 2 millimeters.

8. A magnifier lens assembly mounted within a lamp head as in claim 1, wherein each of the lenses is crown glass where N=1.523 at approximately 587 nm.

9. A magnifier lens assembly mounted within a lamp head as in claim 1, wherein the distance between said first lens and said second lens measured along said center axis is approximately 0.5 millimeters.

10. A magnifier lens assembly mounted within a lamp head as in claim 9 wherein said distance is defined by spacer means extending annularly along an inner surface of said barrel housing.

11. A magnifier lens assembly mounted within a lamp head as in claim 1, wherein the distance between said second lens and said third lens measured along said center axis is approximately 9 millimeters.

12. A magnifier lens assembly mounted within a lamp head as in claim 11, wherein said distance is defined by spacer means extending annularly along an inner surface of said barrel housing.

* * * * *